R. R. RUST.
PIPE COUPLING.
APPLICATION FILED APR. 16, 1909.
961,987.
Patented June 21, 1910.
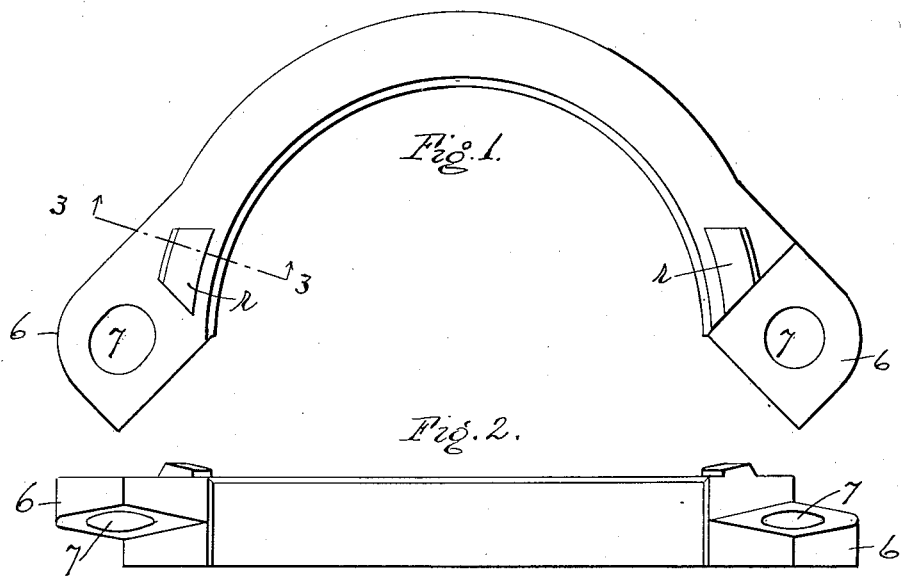
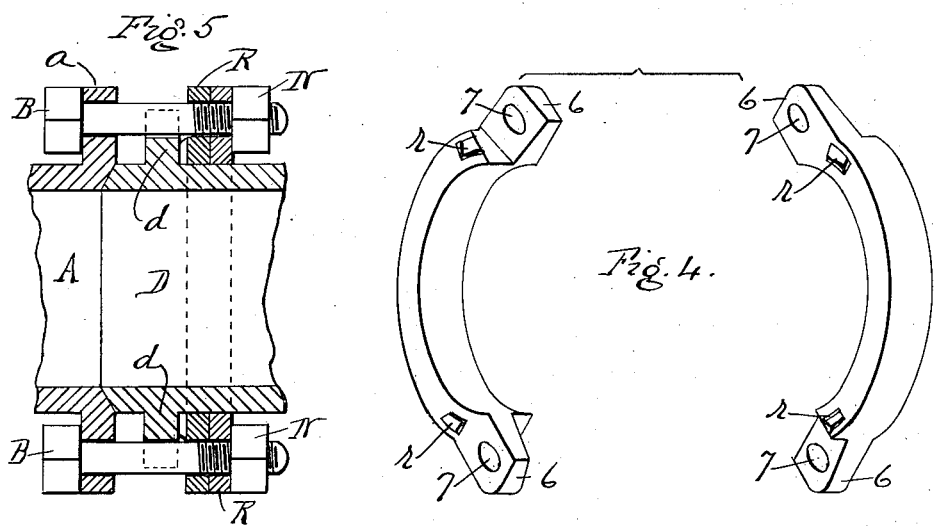
WITNESSES
INVENTOR
Robert R. Rust
BY
Howson and Howson
ATTORNEYS

UNITED STATES PATENT OFFICE.

ROBERT R. RUST, OF NEW YORK, N. Y.

PIPE-COUPLING.

961,987.

Specification of Letters Patent.  Patented June 21, 1910.

Application filed April 16, 1909.  Serial No. 490,236.

*To all whom it may concern:*

Be it known that I, ROBERT R. RUST, a citizen of the United States of America, residing in the borough of Manhattan, in the city, county, and State of New York, have invented certain new and useful Improvements in Pipe-Couplings, of which the following is a specification.

My invention relates to pipe coupling means, more particularly for pipes made of cast iron or like inelastic metal.

The object of my invention is to provide convenient and simple means for securely coupling the pipe sections together to secure a good joint, and this without danger of breaking lugs, flanges or other coupling parts when the draw bolts and nuts are tightened up.

In the accompanying drawing Figure 1 is a side view of a coupling ring section; Fig. 2 is an edge view; Fig. 3 is a sectional view on the line 3—3, Fig. 1; Fig. 4 is a perspective view of a pair of the rings, drawn to a smaller scale; Fig. 5 is a sectional view showing two pipe ends secured together by the use of my improved rings.

While my improvement is applicable to various forms of pipe ends, I have shown it in Fig. 5, by way of example, applied to a form in which one pipe section A has perforated lugs or flange $a$ for the passage of headed securing bolts B, B, while the end of the adjacent section D has a notched projecting part $d$ in the form of a flange or lugs for the guidance of the bolts. In conjunction with the part $d$, I provide the sectional rings R, R, to embrace the pipe and bear against the flange or lugs $d$. The detailed construction of these rings will be best understood by reference to Figs. 1 to 4. It will be seen that in the present instance the ring is made in two sections, each approximately a semi-circle with a perforated lug 6 at each end. Each lug is made about half the thickness of the ring and with its inner face beveled, as best shown in Fig. 2, so that when the two halves are put together to form a complete circle the lugs 6 on one part will fit over the lugs on the other part with the holes 7 in the fitted lugs in alinement to receive the ends of the draw bolts B, which thereby keep the ring sections together in a complete ring. Nuts N, Fig. 5, screw onto the ends of the bolts to draw the ends of the pipe sections together by pressing the ring sections R against the bearing face of the lugs or flange $d$. This bearing face of the flange $d$ is in a plane substantially at right angles to the axis of the pipe. On the faces of the ring sections which are to lie next to this flange $d$ I provide projecting bearing faces $r$, $r$, adjacent to the lugs 6, so that when the nuts N are screwed up, these projections $r$ will afford definite bearing points adjacent to the bolts and insure a better joint at the meeting faces of the pipe ends than if the ring should bear against the flange $d$ all the way around. This construction will also avoid breakage such as might otherwise happen if the flange $d$ were uneven.

I prefer to form the cut-away or reduced part to produce the half thickness of lug 6 at opposite ends of each ring section R on opposite faces as shown in Figs. 2 and 4, so that all ring sections will be exactly alike and interchangeable.

I claim as my invention—

A sectional bearing ring for coupling pipes, having perforated matching lugs at the ends of the sections for the passage of draw bolts and projecting bearing faces adjacent to said lugs, in combination with a pipe section having a flange with a bearing face adjacent to the ring in a plane substantially at right angles to the axis of the pipe.

In testimony whereof I have signed my name to this specification, in the presence of two subscribing witnesses.

ROBERT R. RUST.

Witnesses:
WALTER E. BURGESS,
WILLIAM HALTON.